(12) United States Patent
Johansson et al.

(10) Patent No.: US 7,099,865 B1
(45) Date of Patent: Aug. 29, 2006

(54) METHOD AND ARRANGEMENT IN A DISTRIBUTED SYSTEM

(75) Inventors: Staffan Johansson, Luleå (SE); Daniel Jannok, Luleå (SE); Christoffer Andersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/461,110

(22) Filed: Dec. 14, 1999

(30) Foreign Application Priority Data

Dec. 15, 1998 (SE) .................................... 9804333

(51) Int. Cl.
*G06F 17/30* (2006.01)
(52) U.S. Cl. .......................... 707/8; 707/10; 455/3.01
(58) Field of Classification Search .................. 371/5, 371/39; 707/1–10, 200–206, 219–222; 717/11
See application file for complete search history.

(56) References Cited

U.S. PATENT DOCUMENTS

| | | | | |
|---|---|---|---|---|
| 4,541,091 A | * | 9/1985 | Nishida et al. | 714/756 |
| 5,528,621 A | * | 6/1996 | Heiman et al. | 375/133 |
| 5,765,172 A | * | 6/1998 | Fox | 707/204 |
| 5,870,765 A | * | 2/1999 | Bauer et al. | 707/203 |
| 5,884,325 A | * | 3/1999 | Bauer et al. | 707/201 |
| 5,926,816 A | * | 7/1999 | Bauer et al. | 707/8 |
| 5,978,805 A | * | 11/1999 | Carson | 707/10 |
| 6,295,541 B1 | * | 9/2001 | Bodnar et al. | 707/203 |
| 6,324,693 B1 | * | 11/2001 | Brodersen et al. | 717/177 |
| 6,516,189 B1 | * | 2/2003 | Frangione et al. | 455/405 |

FOREIGN PATENT DOCUMENTS

| | | |
|---|---|---|
| EP | 0 655 670 A2 | 8/1995 |
| EP | 0 847 145 A2 | 6/1998 |
| WO | 95 19003 A1 | 7/1995 |
| WO | 98 56149 A1 | 12/1998 |

* cited by examiner

*Primary Examiner*—Sam Rimell
*Assistant Examiner*—Mellissa M. Chojnacki

(57) ABSTRACT

A method and arrangement in a distributed system for synchronizing configuring data at a receiving unit with corresponding source configuring data. The configuring data and the source configuring data are arranged in one or preferably several groups of data. Reference checksums are calculated (201) for each data group. The receiving unit determines (202) whether the content in each data group of the configuring data at the receiving unit matches the corresponding reference checksum. The receiving unit requests (203) the source unit to transfer copies to the receiving unit of the source configuring data in those data groups for which a mismatch is detected. The requested data is downloaded (204) from the source unit to the receiving unit.

16 Claims, 7 Drawing Sheets

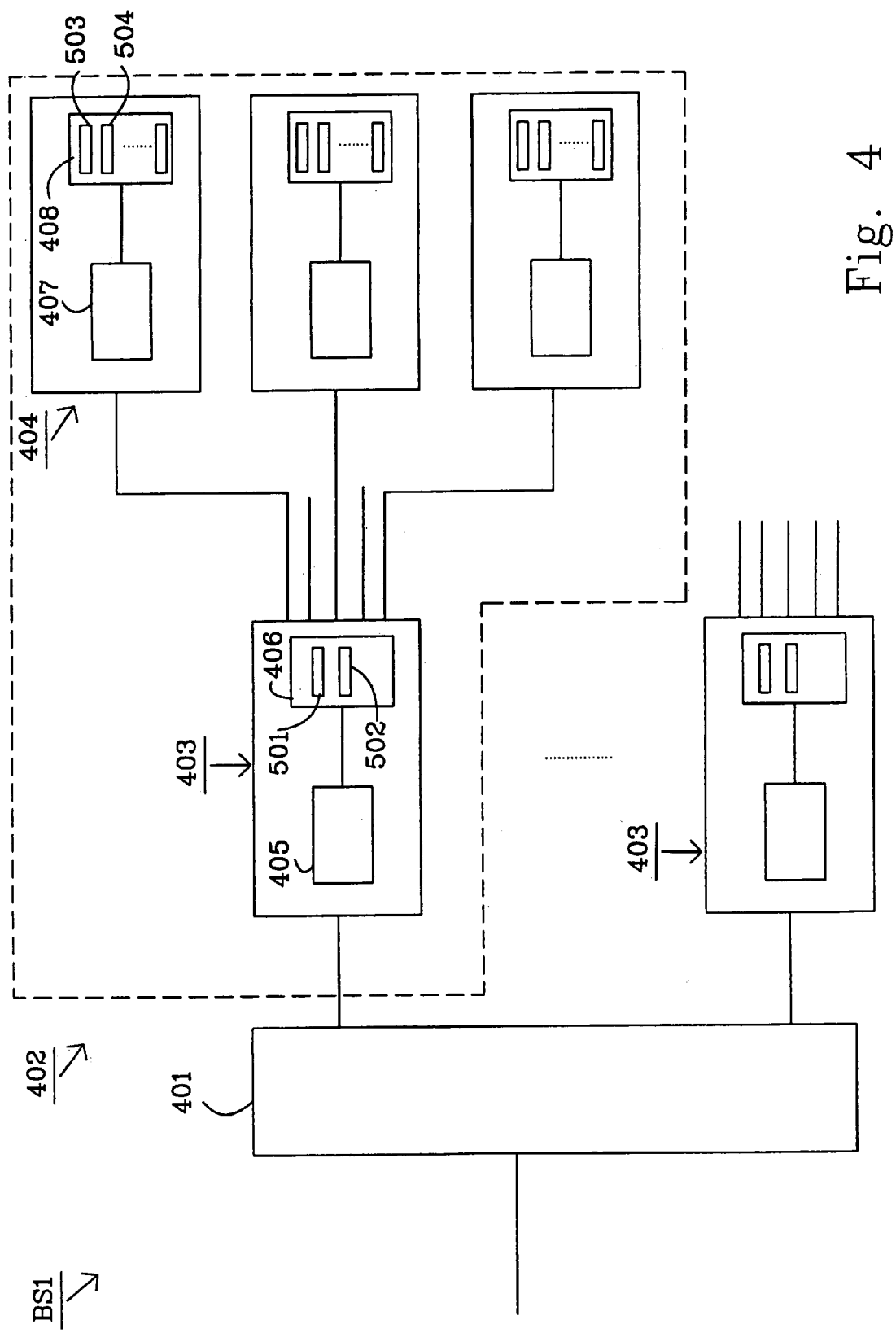

METHOD AND ARRANGEMENT IN A DISTRIBUTED SYSTEM

This application claims priority under 35 U.S.C. §§119 and/or 365 to 9804333-4 filed in Sweden on Dec. 15, 1998; the entire content of which is hereby incorporated by reference.

TECHNICAL FIELD OF THE INVENTION

The invention relates to a method and an arrangement in a distributed system comprising a receiving unit and a source unit. More specifically the invention relates to a method and arrangement for synchronizing configuring data at the receiving unit with corresponding source configuring data stored at the source unit.

DESCRIPTION OF RELATED ART

In many distributed systems there is a need of a mechanism for synchonizing configuring data at a receiving unit with corresponding source configuring data stored at a source unit in order to ensure that the configuring data at the receiving unit is consistent with the corresponding source configuring data stored at a source unit.

One example of such a distributed system is the CMS8800 system, i.e. Ericsson's cellular system for D-AMPS, where a number of base stations are connected to a mobile services switching centre. In present CMS8800 systems configuring data at a base station is maintained consistent with corresponding source configuring data at the mobile services switching centre by downloading a complete copy of the source configuring data that relates to the base station upon each system restart that takes place after a period of interruption of system operation. This approach ensures that after a system restart the configuring data at the base station is consistent with the corresponding source configuring data at the mobile services switching centre. However, often when a system restart occurs, the configuring data at the base station is in fact already consistent with the source configuring data at the mobile services switching centre. Since downloading configuring data to a number of base stations is time consuming and causes significant loads in primarily the mobile services switching centre and communication links interconnecting the mobile services switching centre and the base stations, it would be preferrable to have a method of maintaining said consistency which eliminates or at least lessens the number of occasions when configuring data is downloaded from the mobile services switching centre when there is no inconsistency between the configuring data at the base station and the source configuring data at the mobile services switching centre.

The european patent application EP 665 670 discloses a method and apparatus for decreasing the time required to update files located at a remote computer. The method identifies and isolates the difference between a reference file in a receiveing computer and a source file in a sending computer. Only said differences are transmitted to the receiving computer.

EP 665 670 also discloses a method for synchronizing data at a receiving unit with data at a source unit. Multiple reference keys corresponding to groups of data stored at the receiving unit are determined and transmitted to the source unit. A source key corresponding to a group of data in the source unit is determined and compared with the multiple reference keys. If the source key does not match any of the reference keys, data is transmitted from the source unit to the receiving unit. If the source key matches a reference key, a control signal is transmitted to the receiving unit which causes the receiving unit to use data at the corresponding unit corresponding to the matched reference key. The steps of calculating a source key, comparing the source key to the multiple reference keys and transmitting data/control signals are repeated for additional groups of source data in the source unit until the data at the receiving unit has been synchronized with the data at the source unit.

In the synchronization method disclosed in EP 665 670, the source unit determines which data groups at the receiving unit that need to be updated. In a situation when the source unit is connected to a plurality of receiving units, the determination of which data groups that need to be updated in the receiving units causes a significant processing load at the source unit.

Another problem with the synchronization method disclosed in EP 665 670 is that the method requires the source unit to calculate source keys for the data groups in the source unit each time synchronization is performed. This results in further processing load at the source unit if synchronization is repeatedly performed and in particular when the source unit is connected to a plurality of receiving units.

SUMMARY OF THE INVENTION

The problem dealt with by the present invention is to provide an efficient way of synchronizing configuring data at a receiving unit with corresponding source configuring data.

The problem is solved essentially by a method and arrangement in which the receiving unit determines whether the content of the configuring data at the receiving unit matches corresponding reference checksums and requests downloading of data from the source unit upon detecting inconsistency.

More specifically, the problem is solved in the following manner. The configuring data and the source configuring data are each arranged in one or preferrably several groups of data. Reference checksums are calculated for each data group. The receiving unit determines whether the content in each data group of the configuring data at the receiving unit matches the corresponding reference checksum. The receiving unit requests the source unit to transfer copies to the receiving unit of the source configuring data in those data groups for which a mismatch is detected. The requested data is downloaded from the source unit to the receiving unit.

A general object of the invention is to provide an efficient way of synchronizing configuring data at a receiving unit with corresponding source configuring data at a source unit.

A more specific object of the invention is to provide a way of synchronizing data in which only those data groups of the configuring data at the receiving unit which are suspected of being corrupted need to be downloaded anew from the source unit.

Another object of the invention is to provide a way of synchronizing data in which the source unit is relieved of the task of determining which data groups of the configuring data at the receiving unit that need to be updated due to the data groups being corrupted.

Still another object of the invention is to provide a way of synchronizing data in which the source unit is not required to calculate reference checksums anew each time synchronization is performed.

A general advantage afforded by the invention is that configuring data at a receiving unit can be synchronized with corresponding source configuring data at a source unit in an efficient way, in particular when synchronization is repeatedly performed and/or the source unit is connected to a plurality of receiving units.

A more specific advantage offered by the invention is that only those data groups of the configuring data at the receiving unit which are suspected of being corrupted need to be downloaded anew from the source unit upon synchronization.

Another advantage of the invention is that the source unit upon synchronization is relieved of the task of determining which data groups of the configuring data at the receiving unit that need to be updated due to the data groups being corrupted.

Still another advantage provided by the invention is that the source unit does not need to calculate reference checksums anew each time synchronization is performed.

The invention will now be described in more detail with reference to exemplifying embodiments thereof and also with reference to the accompanying drawings.

BRIEF DESCRIPTION OF THE DRAWINGS

FIG. 4 is a block diagram illustrating a receiving unit in the form of a base station.

DETAILED DESCRIPTION OF THE EMBODIMENTS

Figure 3:
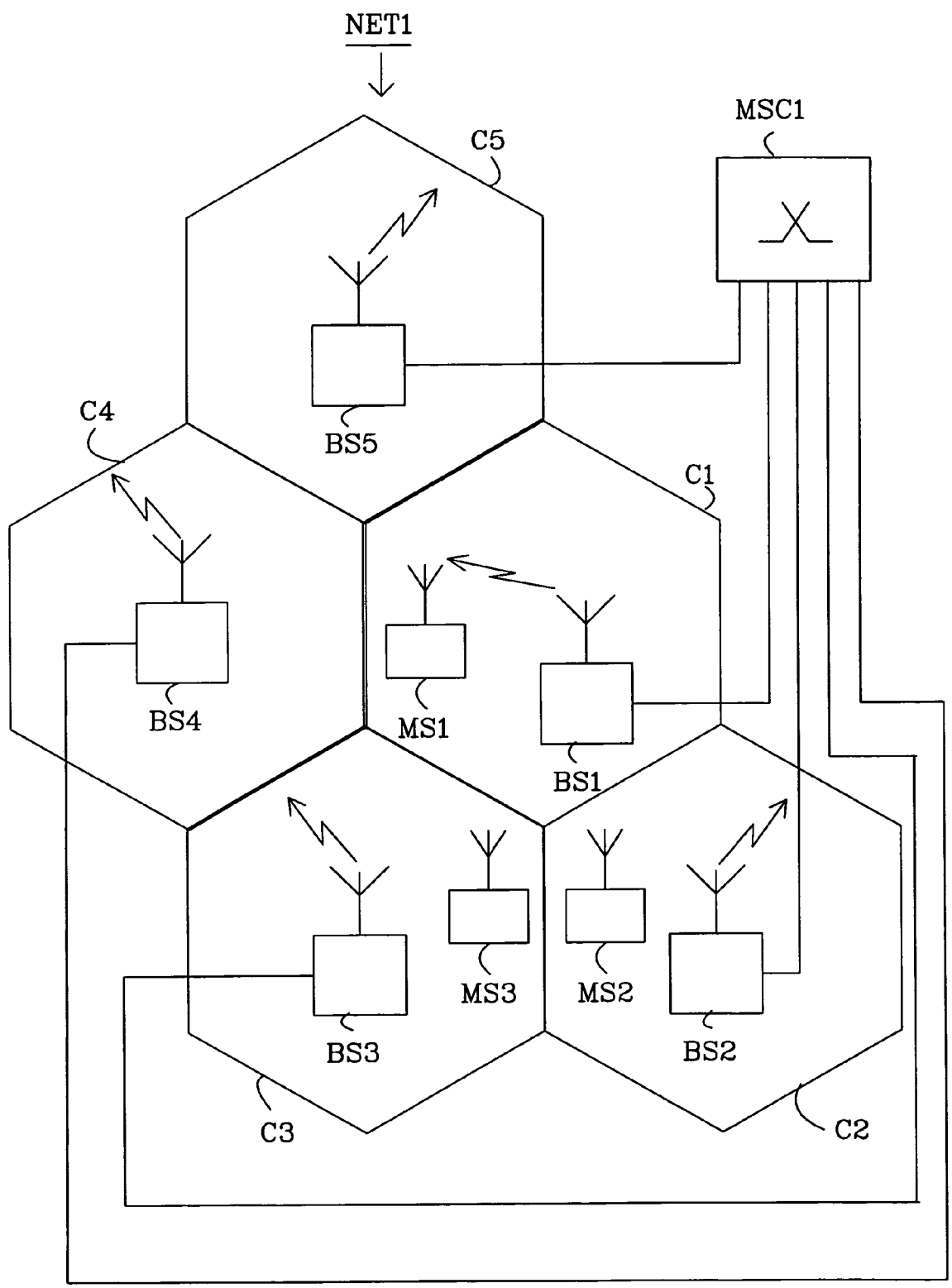
FIG. 3 is a view of a cellular network.

FIG. 3 illustrates a cellular network NET1 and a number of mobile stations MS1–MS3. The cellular network NET1 comprises a mobile services switching centre MSC1 and base stations BS1–BS5 connected to the mobile services switching centre MSC1. The base stations BS1–BS5 provide radio coverage in a geographical area served by the mobile services switching centre MSC1. The geographical area is divided into a number of cells C1–C5. In each cell C1–C5 radio coverage is provided by one of the base stations BS1–BS5 respectively. The mobile services switching centre MSC1 is responsible for switching calls to and from mobile stations MS1–MS3 located in the geographical area served by the mobile services switching centre MSC1. Note that the cellular network NET1 in FIG. 3 is an accurate but simplified illustration of a cellular network. A typical cellular network comprises several mobile services switching centres, a greater number of base stations as well as other types of nodes such as home location registers.

In the cellular network NET1, the mobile services switching centre MSC1 downloads configuring data to the base stations BS1–BS5 connected to the mobile services switching centre. The configuring data downloaded to each base station BS1–BS5 comprises different parameters being set to enable proper operation of each base station BS1–BS5. Examples of such parameters are those defining physical radio channels and logical channels allocated to a cell. A common characteristic of all the configuring data downloaded from the mobile services switching centre MSC1 is that it should be treated as read-only data at each base station BS1–BS5, i.e. the base station BS1–BS5 should not modify any part of the configuring data. Thus the configuring data at the base station BS1–BS5 should be consistent with corresponding source configuring data stored at the mobile services switching centre MSC1. However, due to disturbances of a base station BS1, the configuring data at the base station BS1 may become corrupted. Hence there is a need of a method and arrangement for synchronizing the configuring data at the base stations BS1–BS5 with the corresponding source configuring data at the mobile services switching centre MSC1.

The present invention provides such a method and arrangement for data synchronization.

Figure 1:
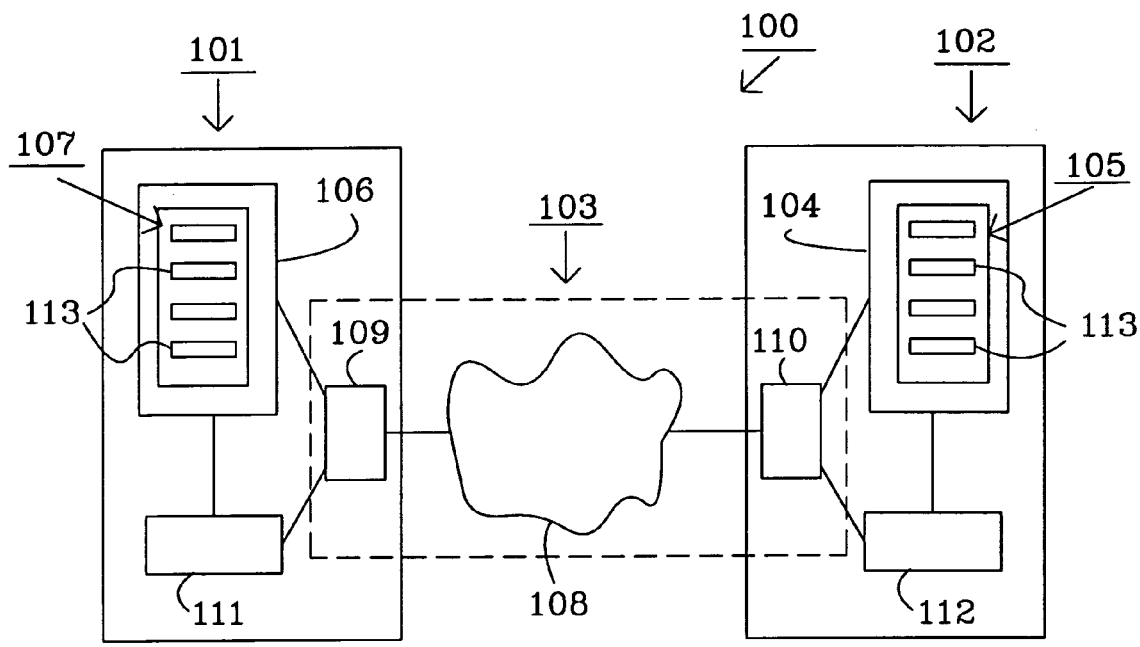
FIG. 1 is a schematic view of a distributed system in which the invention is applied.

FIG. 1 is a schematic view of a distributed system 100 in which the present invention is implemented. The system comprises a source unit 101 and a receiving unit 102. Note that the used terminology only reflects the roles the units 101–102 fulfil with respect to the present invention. The source unit 101 may e.g. be the mobile services switching centre MSC1 in FIG. 1 and the receiving unit 102 may be one of the base stations, e.g. BS1, connected to the mobile services switching centre MSC1.

The receiving unit 102 comprises first storage means 104 for storing configuring data 105 and the source unit 101 comprises second storage means 106 for storing corresponding source configuring data 107. The configuring data 105 and the source configuring data 107 are arranged in one or several groups of data 113. The source unit 101 and the receiving unit 102 are interconnected via data transfer means 103, i.e. some kind of communication network 108 and matching interfaces 109–110 at the respective unit 101–102, enabling transfer of configuring data and other information between the source unit 101 and the receiving unit 102. The source unit 101 further comprises control means 111, e.g. a processor or a group of processors executing software, controlling the operation of the source unit 101. Likewise, the receiving unit 102 also comprises control means 112, e.g. a processor or a group of processors executing software, for controlling the operation of the receiving unit 102.

In the distributed system 100 it is desirable that the configuring data 105 at the receiving unit 102 is consistent with the corresponding source configuring data 107 at the source unit 101. Due to disturbances of the receiving unit 102, the configuring data 105 may become corrupted and thus inconsistent with the source configuring data 107.

Figure 2:
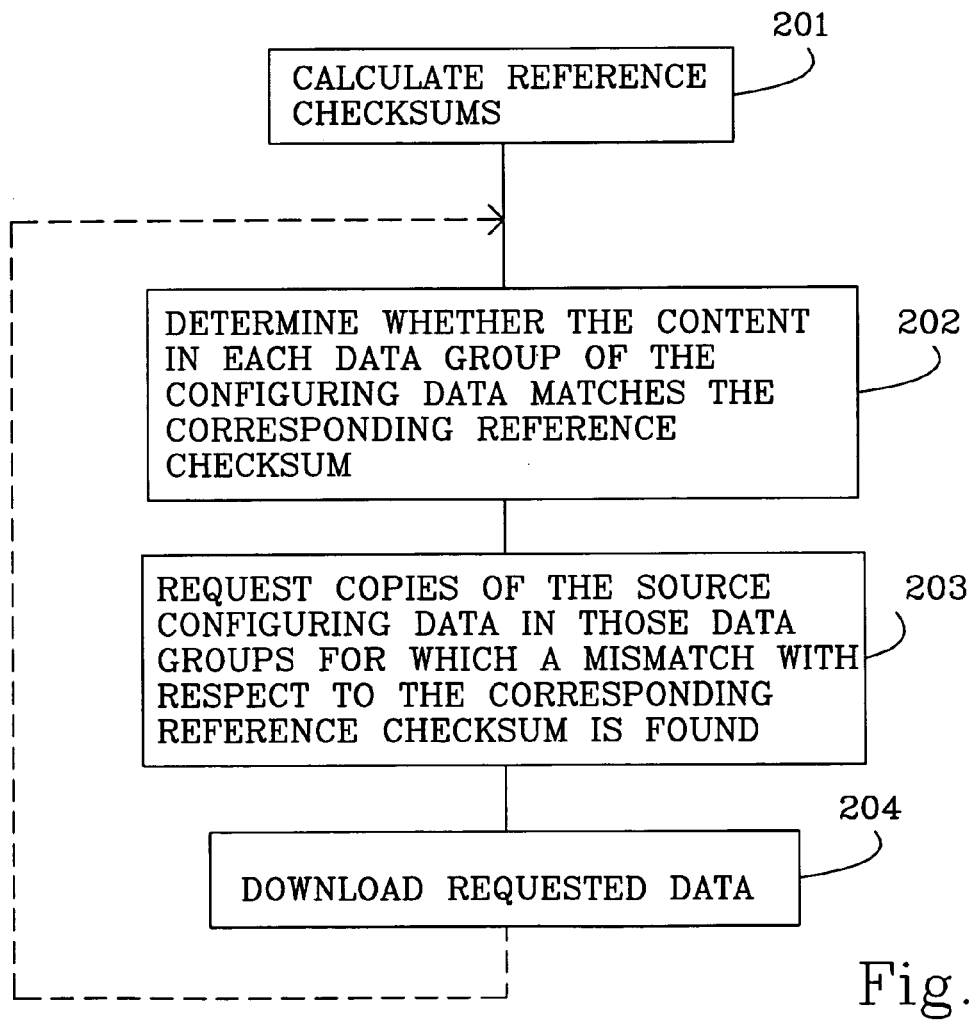
FIG. 2 is a flow chart illustrating a basic method according to the invention.

FIG. 2 is a flow chart illustrating a basic method according to the invention for synchronizing the configuring data 105 at the receiving unit 102 with the corresponding source configuring data 107 at the source unit 101.

At step 201 reference checksums are calculated for each data group.

At step 202 the receiving unit 102 determines whether the content in each data group 113 of the configuring data 105 at the receiving unit 102 matches the corresponding reference checksum calculated at step 201.

At step 203 the receiving unit 102 requests the source unit 101 to transfer copies of the source configuring data 107 in those data groups 113 for which a mismatch with respect to the corresponding reference checksum was found at step 202.

At step 204 the requested data, i.e. copies of the source configuring data in those data groups for which a mismatch was found at step 202, is downloaded from the source unit 101 to the receiving unit 102.

The basic method demonstrated in FIG. 2 illustrates some important characteristics of the inventive method.

One basic characteristic of the method is that when corruption of the configuring data 105 is detected, only copies of those data groups considered to be corrupted need to be downloaded. This can amount to considerable savings in terms of the amount of data being downloaded from the source unit 101 to the receiving unit 102 if there is a great number of data groups of which e.g. only one has become corrupted.

Another basic characteristic of the method is that the receiving unit 102 determines whether any data group 113 of the configuring data 105 at the receiving unit 102 have become corrupted, i.e. the source unit 101 is relieved of this task. Thus the processing load at the source unit 101 is reduced which is an important advantage, especially if the source unit 101 is connected to a plurality of receiving units. As an example, a typical Ericsson CMS8800 mobile services switching centre may as a source unit be connected to 100–150 base stations.

There are a number of different alternative ways of implementing the basic method illustrated in FIG. 2 resulting in different embodiments of the inventive method.

The reference checksum calculations at step 201 may preferably be performed by the source unit 101 using the content of the source configuring data 107 at the source unit and downloaded to the receiving unit 102 prior to performing step 202. The reference checksums may be calculated according to the well known cyclic redundancy-code (CRC) algorithm. As a person skilled in the art realises, there are several other alternative ways of calculating reference checksums apart from using the CRC-algorithm. One example of an alternative way of calculating reference checksums would be to divide each data group into a number of data words, determine a parity bit for each data word in the data group so that the data word together with the parity bit contains an even (or alternatively odd) number of ones and combine all the parity bits determined for the data group into a reference checksum for the data group. Another example of an alternative way of calculating reference checksums would be to divide each data group into a number of data words, determine N number of control bits for each data word as the value of the data word modulo $2^N$ and combine all the control bits determined for the data group into a reference checksum for the data group.

Instead of performing the reference checksum calculations using the content of the data groups 113 of the source configuring cata 107, the reference checksum calculations at step 201 may be performed using the content of the data groups 113 of the configuring data 105 at the receiving unit 102 e.g. upon initial downloading of the configuring data 105. This latter approach implies that corruption of the configuring data 105 occuring after calculation of the reference checksums can be detected but not corruption occuring e.g. in connection with initial downloading of the configuring data 105.

One way of performing step 202 is to divide step 202 into two substeps:

a) calculating checksums at the receiving unit 102 for each data group 113 of the configuring data 105 stored in the first storage means 105 at the receiving unit 102;

b) comparing the calculated checksums to the corresponding reference checksums.

Steps 202–204, may be performed repeatedly as indicated by the dashed line in FIG. 2. This implies that the receiving unit 102 repeatedly performs monitoring cycles to determine whether the configuring data 105 has become corrupted and requests updating of the configuring data 105 in the event of corruption. By repeatedly monitoring the configuring data consistency and performing redeeming actions in the event of corrupted data being detected, the configuring data 105 at the receiving unit 106 is reliable to a higher extent and the need for downloading of new configuring data at system restart is reduced. Another significant advantage of the invention when repeatedly monitoring the configuring data consistency, is that the source unit 101 does not need to calculate the reference checksums anew for each monitoring cycle, thus reducing the processing load of the source unit 101.

The monitoring cycles at step 202 may be initiated periodically with a predetermined time interval between each monitoring cycle. The frequency of initiating monitoring cycles at step 202 is selected as a tradeoff between the requirement of fast detection and correction of a data inconsistency and the requirement to minimize the processing load caused when performing a monitoring cycle.

Instead of monitoring all data groups 113 of the configuring data 105 at the receiving unit in each monitoring cycles, the data groups 113 of the configuring data 105 at the receiving unit 102 may be divided into a number of subsets and monitoring cycles may be initiated with individual periodicity for each subset. The predetermined time intervals used between each monitoring cycle may thus be selected differently for the different subsets. This alternative may be attractive e.g. in a situation when data groups are distributed over a number of different memory units at the receiving unit of which some are more likely to experience disturbances than others.

The source unit 101 may initiate performance of step 202 by sending an explicit signal to the receiving unit 102. However, when repeatedly performing monitoring cycles, the receiving unit 102 preferrably initiates performance of step 202 on its own. Thus the processing load of the source unit 101 is further reduced. These two different ways of initiating step 201 can also be combined. As an example of such a combination, the receiving unit 102 may periodically initiate monitoring cycles using reference checksums previously downloaded from the source unit 101. In addition to the monitoring cycles being periodically initiated by the receiving unit 102, the source unit 101 may initiate a complementary monitoring cycle by sending an explicit signal to the receiving unit 102 e.g. when the source unit 101 detects operation disturbances of the receiving unit 102. The signal from the source unit 101 may contain fresh reference checksums to be used in the complementary monitoring cycle and subsequent periodically initiated monitoring cycles.

The different data groups 113 may be classified according to how urgently the content of each data group is needed by the receiving unit 102 in order to operate and step 204 may be performed so that copies of the source configuring data in data groups classified as more urgent are downloaded before copies of the source configuring data in data groups classified as less urgent. In the context of the CMS8800 system, this feature could be applied so that e.g. data groups containing configuring data needed to enable operation of a control channel and at least one digital traffic channel or voice channel are classified as more urgent and data groups containing data needed for supervision of the base station are classified as less urgent. Thus, the data needed to enable operation of the control channel and the at least one digital traffic channel or voice channel is downloaded before other data groups. This enables the base station to restart operation and provide service earlier than if this urgent data was the last data downloaded.

A preferred embodiment of the invention for use in the context of the cellular network NET1 in FIG. 3 is illustrated in FIGS. 4–7.

A schematic block diagram of one of the base stations BS1–BS5 in FIG. 3 is illustrated in FIG. 4. The base station BS1 comprises an interface 401 for connecting the base station BS1 via PCM-links to the mobile services swiching centre MSC1. A number of extension modules 402 are connected in parallel to the interface 401. Each extension module 402 comprises an Extension Module Regional Process (EMRP) unit 403 and a number of devices 404 connected to the EMRP-unit 403. In the base station BS1 there are different kinds of devices such as Transceiver devices (TRX), Radio Frequency Test Loop Equipment (RFTL), Alarm module (ALM) and Combiner Tuner Controller (CTC). The devices 404 illustrated in FIG. 4 are transceivers, i.e. devices transmitting and receiving radio signals. The EMRP-unit 403 includes an Extension Module Regional processor 405 and an EMRP-memory unit 406. Each device 404 comprises a device processor 407 and a device memory unit 408.

The EMRP-memory units 406 in all extension modules together with all the device memory units 408 in the base station BS1 collectively correspond to the first storage means 104 in FIG. 1. In a similar way, all the Extension Module Regional processors 405 together with the device processors 407 collectively correspond to the control means 112 in FIG. 1.

Figure 5A:
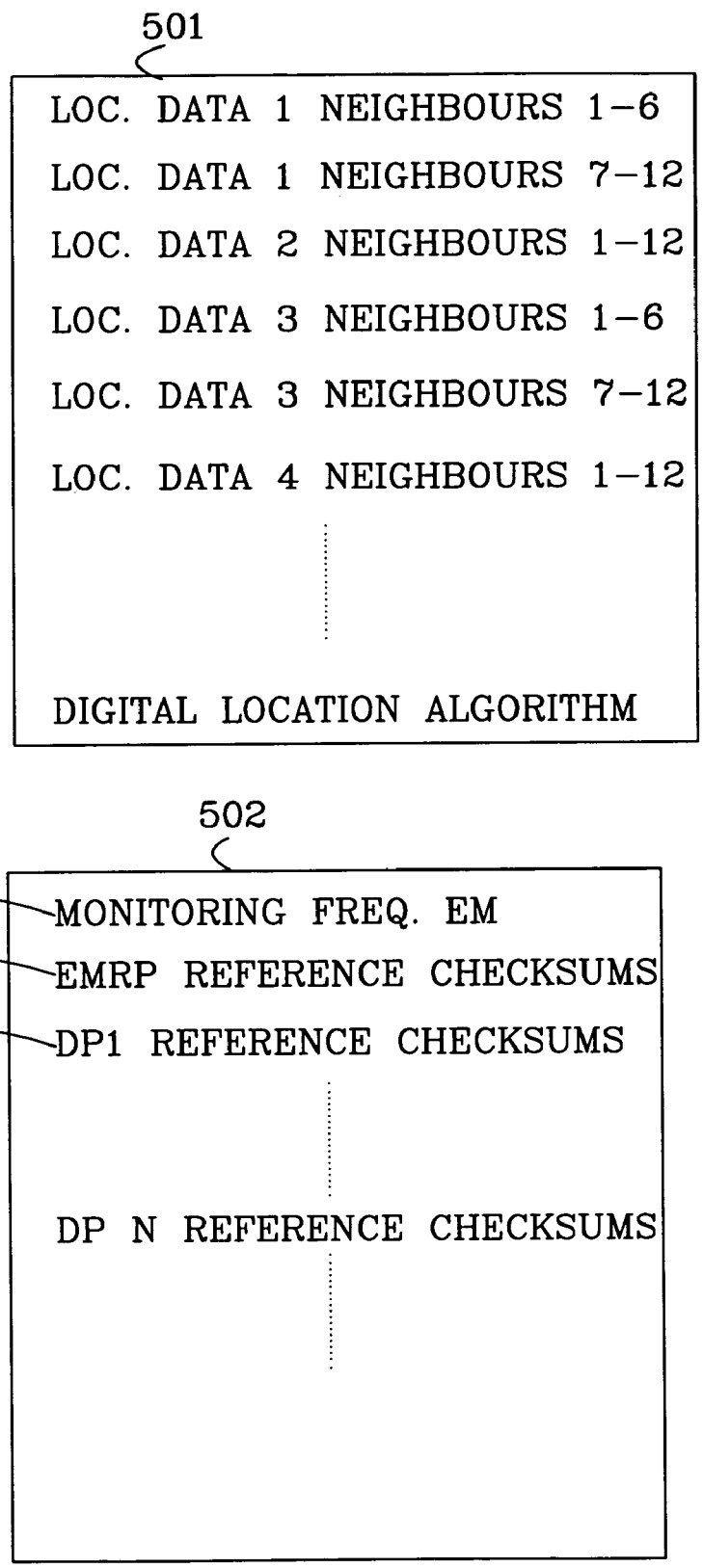
FIGS. 5A–5B are diagrams illustrating data groups of configuring data at the base station of FIG. 4.
Figure 5B:
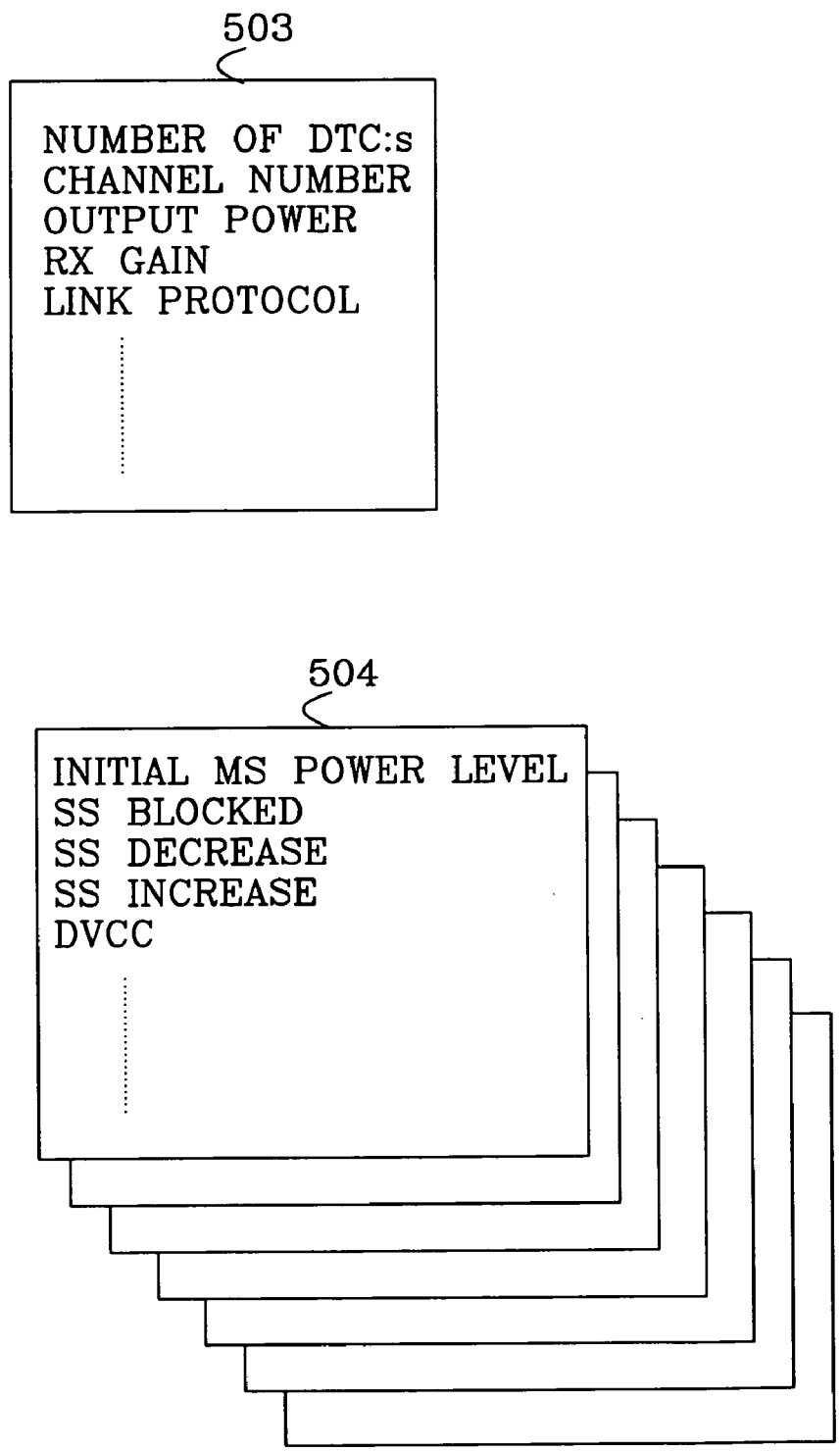

FIGS. 5A–5B illustrates how the configuring data at the base station BS1 in FIG. 4 as well as the corresponding source configuring data at the mobile services switching centre MSC1 are divided into a number of data groups. Note that FIGS. 5A–5B do not disclose all the data groups in the base station BS1 but only an exemplary subset to illustrate the invention.

FIG. 5A illustrates two data groups which are stored in the EMRP-memory unit 406 in the base station BS1.

One data group 501 comprises cell configuring data such as information defining which cells are considered as neighbouring cells and parameters used in handoff algorithms for determining when a mobile station MS1–MS3 should be handed over to/from the cell C1 served by the base station BS1.

A second data group 502 comprises data used in the supervision of the extension module 402. This data group 502 comprises configuring data 505 defining the frequency of initiating monitoring cycles for determining the consistency of the data groups stored in the EMRP-memory unit 406 and the respective device memory unit 408 in the extension module 402. The data group 502 also comprises reference checksums 506–507 corresponding to the data groups 501–502 stored in said memory units 406 and 408.

FIG. 5B illustrates two different types of data groups 503 and 504 which are stored in each device memory unit 408 of each transceiver (TRX) 404 in the extension module 402. One data group 503 comprises equipment data such as:

number of digital traffic channels supported by the TRX 404;
channel number defining the radio carrier frequencies used when transmitting and receiving radio signals from/to the TRX;
permitted maximal output power level used when transmitting radio signals;

The other type of data group 504 comprises information defining digital traffic channels. There is one instance of this data group for each digital traffic channel supported by the TRX. Each individual data group of this type comprises various data such as:

intial power level to be used by a mobile station when communicating on the digital traffic channel;
signal strength thresholds defining when a mobile station should be ordered to decrease or increase its transmission power;
a signal strength threshold defining when communication with the mobile station should be blocked due to insufficient signal strength;
Digital Verification Color Code;

One important aspect when defining the data groups is to consider how the configuring data will be distributed on different modules in the base station. Each data group should preferably be stored in a single memory unit, i.e. a device memory unit 408 or an EMRP-memory unit 406. The reason for this is primarily to provide for a more efficient way of calculating checksums on the content of the data groups.

Figure 6:
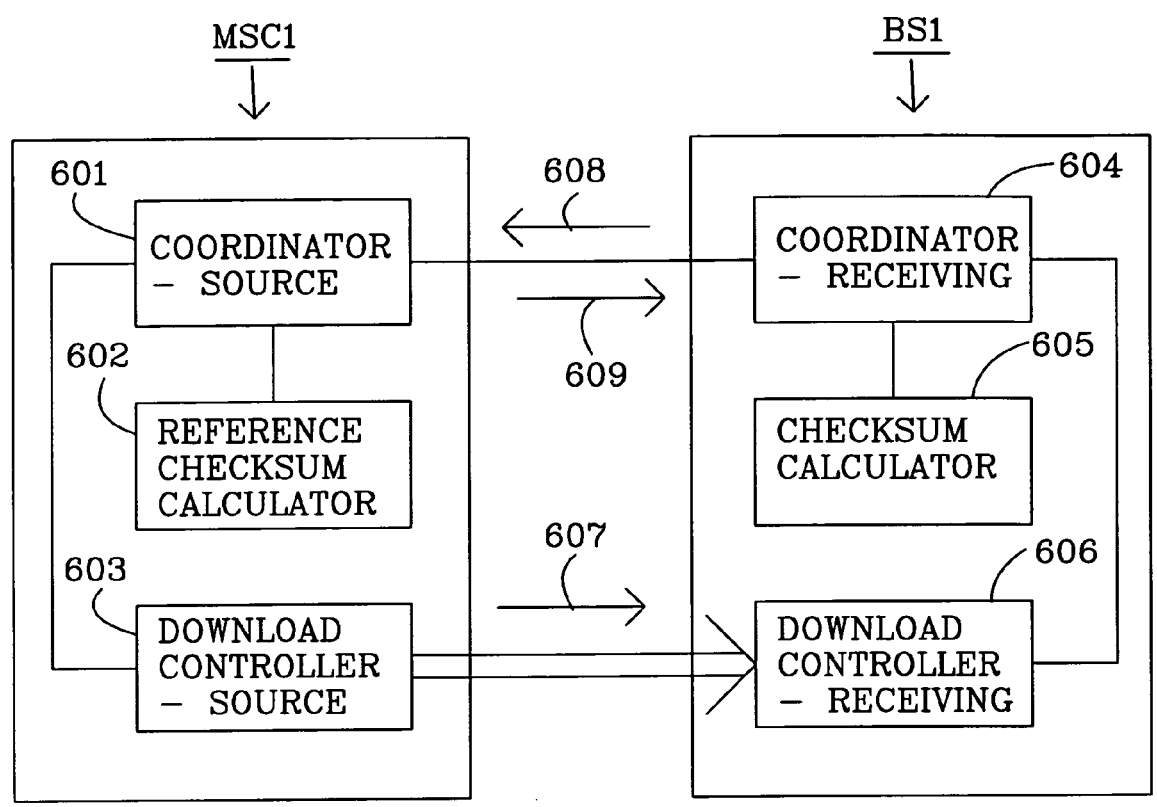
FIG. 6 is a functional block diagram illustrating funtion blocks related to the present invention in a mobile services switching centre and a base station connected to the mobile services switching centre.

FIG. 6 is a functional block diagram illustrating function blocks related to the present invention in the mobile services switching centre MSC1 and the base station BS1 in FIG. 3.

The mobile services switching centre MSC1, which acts as a source unit, comprises the function blocks coordinator-source 601, reference checksum calculator 602 and download controller-source 603. The base station BS1, which acts as a receiving unit, comprises the function blocks coordinator-receiving 604, checksum calculator 605 and download controller-receiving 606.

The coordinator-source function block 601 interacts with the other function blocks 602–603 in the mobile services switching centre MSC1 and is responsible for coordinating all activities related to the present invention within the mobile services switching centre MSC1. The coordinator-source funtion block 601 also interacts with the coordinator-receiving function block 604 at the base station BS1. The reference checksum calculator 602 calculates reference checksums for each data group of source configuring data stored at the mobile services switching centre MSC1 upon receiving an order from the controller-source 601 to perform such calculations. The download controller-source 603 is responsible for copying data from specified data groups of the source configuring data at the mobile services switching centre MSC1 and for transferring the copied data to the base station BS1. The download controller-source 603 is ordered by the coordinator-source 601 to initiate downloading of specified data groups.

The coordinator-receiving function block 604 interacts with the other function blocks 605–606 in the base station BS1 and is responsible for coordinating all activities related to the present invention within the base station BS1. The coordinator-receiving funtion block 604 also interacts with the coordinator-source function block 601 at the mobile services switching centre MSC1. The checksum calculator 605 calculates checksums for each data group of configuring data stored at the base station BS1 upon receiving an order from the coordinator-receiving function block 604 to perform said calculations. The download controller-receiving function block 606 is responsible for receiving the data transferred by the download controller-source function block 603 and storing said data at the base station BS1.

In the base station BS1, the function block coordinator-receiving 604 is distributed on each EMRP-unit 403, the function block checksum calculator 605 is distributed on each EMRP-unit 403 and each device 404, and the function block download controller-receiving 606 is essentially distributed on each EMRP-unit 403. As a consequence of each extension module 402 being essentially independent from the other extension modules, the mobile services switching centre MSC1 interacts with each individual extension module 402. Thus when downloading data, the mobile services switching centre MSC1 downloads to each individual extension module 402 data being relevant for the respective extension module 402, each extension module 402 individually notifying the mobile services switching centre MSC1 as corrupted data groups are detected.

Figure 7:
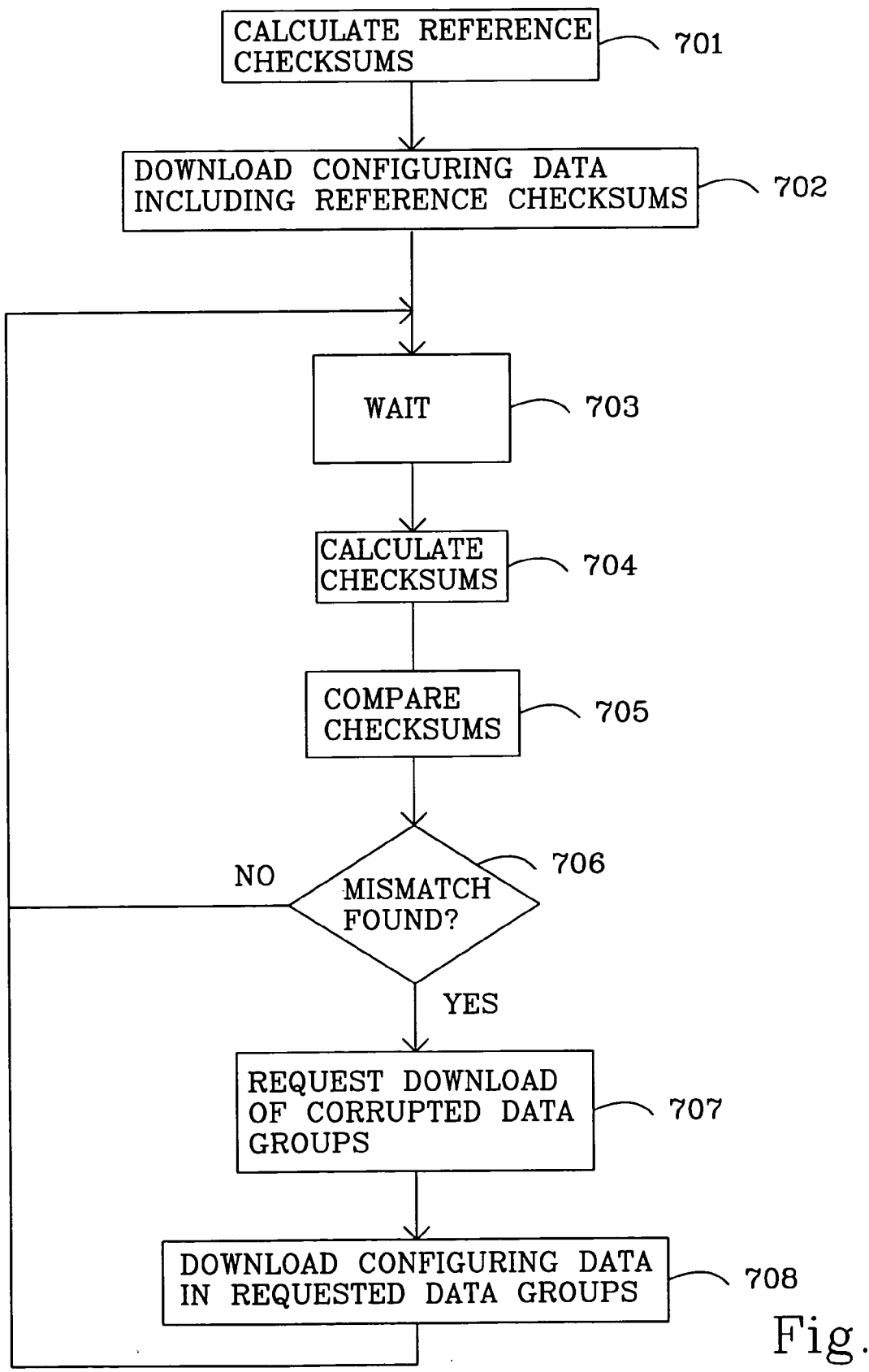
FIG. 7 is a flow chart illustrating a preferred embodiment of the inventive method applied to the mobile services switching centre and the base station illustrated in FIG. 6.

FIG. 7 is a flow chart illustrating a preferred embodiment of a method according to the invention for continuously keeping configuring data at the base station BS1 consistent with the corresponding source configuring data stored at the mobile services switching centre MSC1. The preferred embodiment of the inventive method will be described with reference to FIG. 7 and also to FIG. 4 and FIG. 6.

At step 701 the coordinator-source function block 601 in the mobile services switching centre MSC1 orders the reference checksum calculator 602 to calculate reference checksums for each data group of the source configuring data related to the base station BS1. At step 702 the coordinator-source function block 601 orders the download controller-source 603 to download all relevant source configuring data related to the base station BS1. The download controller-source 603 then retrieves all said relevant source configuring data, including the reference checksums, and transfers this data in update messages 607 to the base station BS1 via the PCM-links interconnecting the mobile services switching centre MSC1 and the base station BS1. One update message 607 is sent for each individual extension module 402 in the base station BS1. The download controller-receiving block 606 receives said data and stores the different data groups in the appropriate memory units at the base station BS1. Thus, after completion of step 702, data groups 501 and 502 are stored in the EMRP-memory unit 406 and the data groups 503–504 are stored in the device memory unit 408.

At the base station BS1, monitoring cycles are performed in parallel on a per extension module basis, i.e. the configuring data at the base station BS1 is divided into subsets corresponding to each extension module and monitoring cycles are performed in each extension module. This implies that steps 703–708 are performed in parallel for each extension module 402.

At step 703 the coordinator receiving function block 604 waits until it is time to initiate a monitoring cycle for the extension module 402. When it is time to initiate a monitoring cycle, the coordinator-receiving block 604 orders the checksum calculator block 605 to perform checksum calculations for each data group of the configuring data stored within the extension module 402. At step 704, the checksums are calculated in parallel by the extension module regional processor 405 and each device processor 407 in the extension module for the data groups stored in the respective memory unit 406, 408 connected to the respective processor 405, 407. The calculated checksums are reported to the coordinator-receiving block 604. At step 705 the calculated checksums are compared by the coordinator-receiving block 604 to the corresponding reference checksums 506–507 of the second data group 502 stored in the EMRP memory unit 406. If there is no data group for which the calculated checksum is different from the corresponding reference checksum (an alternative NO), processing continues at step 703. If a mismatch is found (an alternative YES) between the calculated checksum and the corresponding reference checksum for any of the data groups, e.g. the data group 503, processing continues at step 707 where the coordinator-receiving block 604 issues a status report message 608 to the coordinator-source block 601 informing the coordinator-source block 601 that the data group 503 of the configuring data at the base station BS1 is considered to be corrupted, thus requesting the mobile services switching centre MSC1 to download a fresh copy of the source configuring data in this data group to the base station BS1. At step 708 the coordinator-source block 601 orders the download controller-source block 603 to retrieve a copy of the source configuring data in this data group and to transfer said copy in an update message 607 to the base station BS1. The download controller-receiving block 606 receives said data and updates the device memory unit 408 with the new copy of the data group 503. After step 708 processing continues at step 703, when the coordinator-receiving block 604 waits a predetermined time, i.e. in accordance with the configuring data 505 defining the monitoring frequency, before initiating a new monitoring cycle by ordering checksum calculations at step 704 etc.

In addition to the method illustrated in FIG. 7, a method enabling the mobile services switching centre MSC1 to initiate individual monitoring cycles upon suspecting data in the base station to be corrupted may be provided. Thus, the coordinator-source function block 601 of FIG. 6 may send a synchronization signal 609 to the coordinator-receiving block 604 after which, in essence, method steps 704–708 in FIG. 7 are performed. The synchronization signal 609 may contain fresh reference checksums to be used when performing the comparisions at step 705. Alternatively the reference checksums may be downloaded using an update message 607.

Apart from the exemplifying embodiments of the invention disclosed above, there are several ways of providing rearrangements, modifications and substitutions resulting in additional embodiments of the invention.

As a person skilled in the art appreciates, the invention is in no way limited to CMS8800 cellular system. The invention is applicable to a wide range of other distributed systems and in particular in distributed systems where a source unit is connected to a plurality of receiving units and/or synchronization is performed repeatedly. The source unit and/or the receiving unit may in themselves be distributed systems.

A receiving unit may be connected to more than one source unit, thus containing data groups of configuring data whose corresponding source configuring data groups are stored in different source units. The receiving unit thus contains different sets of configuring data where the corresponding source configuring data is stored in different source units. The receiving unit may be aware of what source unit the different sets of configuring data originates from and interact directly with each respective source unit.

Alternatively, the receiving unit may be unaware that there are different sets of configuring data originating from different source units. The receiving unit may thus treat the configuring data as if originating solely from a first source units of the source units, i.e. interacting only with the first source unit. The first source unit may in turn act as a relay between the receiving unit and the other source units by forwarding data from the other source units to the receiving unit and forwarding requests from the receiving unit for fresh copies of source configuring data groups stored at the other source units.

The invention claimed is:

1. In a wireless telecommunications system, a method of synchronizing configuring data, which is utilized for proper operation of a base station and is stored in a base station database with corresponding configuring data stored in one or more source units each unit having a database for storing configuring data, the base station database and the source unit databases each being arranged in a single data group or a plurality of data groups within each database, the method comprising the steps of:
   calculating a reference checksum for each of the data groups in the base station database and the source unit database, wherein the data groups in the base station database correspond with the data groups in the one or more source units:
   monitoring all base station data groups;
   comparing a calculated checksum of each data group in the base station database to the reference checksum of each corresponding data group in the one or more source units; and
   requesting a copy of the base station data group for which a mismatch is found, to be downloaded to the base station database from the corresponding one or more source units upon detecting a mismatch between the corresponding one or more source units data group's reference checksum and the corresponding calculated checksum.

2. The method of claim 1, further comprising:
   subsequent to the step of calculating reference checksums, downloading the corresponding one or more source units data group reference checksums to the base station, wherein the reference checksum in each data group in the corresponding one or more source units database is calculated using the content of the corresponding one or more source units configuring data.

3. The method of claim 1, wherein the step of comparing the corresponding one or more source units data group reference checksums to corresponding calculated base station data group checksums is initiated upon detecting operation disturbances in the base station.

4. The method of claim 1, wherein the step of comparing the corresponding one or more source units data group reference checksums to the corresponding calculated base station data group checksums further comprises repeating the comparison on a regular basis.

5. The method of claim 4, further comprising repeating the comparison on a regular basis having a predetermined time interval between each comparison.

6. The method of claim 4, further comprising performing the comparison for each data group in the base station database, wherein an individual time interval between comparisons is predetermined for each data group.

7. The method of claim 1, further comprising the steps of:
   performing checksum calculations of the configuring data for each base station data group; and
   comparing the calculated checksums to the reference checksums received from the corresponding one or more source units.

8. The method of claim 1, wherein the base station data groups are classified according to the need for the content of each data group, wherein the configuring data in a data group classified as more urgent is downloaded to the base station prior to downloading configuring data in a data group classified as less urgent and copies of the corresponding one or more source unit's configuring data for each data group are downloaded as needed in order according to the classification of the data group, wherein a source unit comprises a mobile switching center (MSC).

9. In a wireless telecommunications system, a system for synchronizing configuring data stored in a base station database with corresponding configuring data stored in a corresponding one or more source units database, the base station database and the corresponding one or more source units database each being arranged in a single data group or a plurality of data groups within each database, the system comprising:
   means for calculating a reference checksum for each of the data groups in the base station database and the corresponding one or more source units database;
   means for monitoring all base station data groups;
   comparison means for comparing a calculated checksum of each data group in the base station database to the reference checksum of each corresponding data group in the corresponding one or more source units database; and
   means for requesting a copy of the corresponding one or more source units data group for which a mismatch is found, to be downloaded to the base station database from the corresponding source unit data group upon detecting a mismatch between the corresponding source unit data group's reference checksum and the corresponding calculated checksum.

10. The system of claim 9, further comprising means for downloading the corresponding one or more source units data group reference checksums to the base station, wherein the reference checksum in each data group in the corresponding one or more source units database are calculated using the content of the corresponding one or more source units configuring data.

11. The system of claim 9, further comprising means for initiating comparison of the corresponding one or more source units data group reference checksums to the corresponding calculated base station data group checksums upon detecting operation disturbances in the base station.

12. The system of claim 9, further comprising means for repeating the comparison of the corresponding one or more source units data group reference checksums to the corresponding calculated base station data group checksums on a regular basis.

13. The system of claim 12, wherein the means for repeating the comparison of the corresponding one or more source units data group reference checksums further comprises means for repeating the comparison on a regular basis having a predetermined time interval between each comparison.

14. The system of claim 12, further comprising means for performing the comparison for each data group in the base station database, wherein an individual time interval between comparisons is predetermined for each data group.

15. The system of claim 9, further comprising:
   means for performing checksum calculations of the configuring data for each base station data group; and
   means for comparing the calculated checksums to the corresponding one or more source units data group reference checksums received from the corresponding one or more source units.

16. The system of claim 9, further comprising means for classifying the base station data groups, wherein the base station data groups are classified according to the need of the content of each data group, wherein the configuring data in a data group classified as more urgent is downloaded to the base station prior to downloading configuring data in a data group classified as less urgent and copies of the corresponding one or more source units configuring data for each data group are downloaded as needed in order according to the classification of the data group, wherein a source unit comprises a mobile switching center (MSC).

* * * * *

UNITED STATES PATENT AND TRADEMARK OFFICE
CERTIFICATE OF CORRECTION

PATENT NO. : 7,099,865 B1
APPLICATION NO. : 09/461110
DATED : August 29, 2006
INVENTOR(S) : Johansson et al.

It is certified that error appears in the above-identified patent and that said Letters Patent is hereby corrected as shown below:

In Column 1, Lines 46-47, delete "preferrable" and insert -- preferable --, therefor.

In Column 1, Line 58, delete "receiveing" and insert -- receiving --, therefor.

In Column 2, Line 39, delete "preferrably" and insert -- preferably --, therefor.

In Column 5, Line 50, delete "cata" and insert -- data --, therefor.

In Column 6, Line 37, delete "preferrably" and insert -- preferably --, therefor.

In Column 7, Line 67, delete ":" and insert -- . --, therefor.

In Column 8, Line 6, delete "intial" and insert -- initial --, therefor.

In Column 8, Line 14, delete ";" and insert -- . --, therefor.

In Column 8, Line 18, delete "preferably" and insert -- preferably --, therefor.

In Column 8, Line 54, delete "funtion" and insert -- function --, therefor.

In Column 10, Line 32, delete "comparisions" and insert -- comparisons --, therefor.

UNITED STATES PATENT AND TRADEMARK OFFICE
CERTIFICATE OF CORRECTION

PATENT NO. : 7,099,865 B1
APPLICATION NO. : 09/461110
DATED : August 29, 2006
INVENTOR(S) : Johansson et al.

It is certified that error appears in the above-identified patent and that said Letters Patent is hereby corrected as shown below:

In Column 11, Line 15, in Claim 1, after "units" delete ":" and insert -- ; --, therefor.

Signed and Sealed this

Eighteenth Day of December, 2007

JON W. DUDAS
*Director of the United States Patent and Trademark Office*